United States Patent
Chang et al.

(10) Patent No.: US 9,213,166 B2
(45) Date of Patent: Dec. 15, 2015

(54) IMAGING LENS AND ELECTRONIC APPARATUS HAVING THE SAME

(71) Applicant: Genius Electronic Optical Co., Ltd., Taichung (TW)

(72) Inventors: Kuo-Wen Chang, Taichung (TW); Poche Lee, Taichung (TW); Wei-Yu Lo, Taichung (TW)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 430 days.

(21) Appl. No.: 13/738,454

(22) Filed: Jan. 10, 2013

(65) Prior Publication Data

US 2014/0055663 A1 Feb. 27, 2014

(30) Foreign Application Priority Data

Aug. 27, 2012 (TW) .............................. 101130992 A

(51) Int. Cl.
*G02B 9/34* (2006.01)
*G02B 13/00* (2006.01)
*H04N 5/225* (2006.01)
*G02B 13/18* (2006.01)

(52) U.S. Cl.
CPC ................ *G02B 13/004* (2013.01); *G02B 9/34* (2013.01); *G02B 13/18* (2013.01); *H04N 5/225* (2013.01); *H04N 5/2254* (2013.01)

(58) Field of Classification Search
CPC ........ G02B 13/004; G02B 13/18; G02B 9/34; H04N 5/225; H04N 5/2254
See application file for complete search history.

(56) References Cited

U.S. PATENT DOCUMENTS

| 7,012,765 | B2 * | 3/2006 | Matsui et al. ................. 359/771 |
| 7,692,877 | B2 | 4/2010 | Tang et al. |
| 7,755,853 | B2 | 7/2010 | Taniyama |
| 8,068,290 | B1 * | 11/2011 | Tsai et al. ..................... 359/773 |
| 8,089,704 | B2 | 1/2012 | Tang et al. |
| 2005/0024748 | A1 | 2/2005 | Amanai |
| 2009/0207506 | A1 | 8/2009 | Tang et al. |
| 2010/0033616 | A1 | 2/2010 | Huang et al. |
| 2011/0058089 | A1 | 3/2011 | Tang et al. |
| 2011/0058262 | A1 | 3/2011 | Chen et al. |

(Continued)

FOREIGN PATENT DOCUMENTS

| CN | 201903685 U | 7/2011 |
| CN | 202256846 U | 5/2012 |
| JP | 2004-341013 A | 12/2004 |
| JP | 2005-004028 A | 1/2005 |
| JP | 2008-033376 A | 2/2008 |
| JP | 2008-185807 A | 8/2008 |
| JP | 2010-026387 A | 2/2010 |
| JP | 2011-064989 | 3/2011 |

(Continued)

OTHER PUBLICATIONS

Search Report appended in an Office Action issued to Chinese counterpart application No. 201210307438.5 by State Intellectual Property Office of the PRC on Jul. 3, 2014 along with an English translation.

*Primary Examiner* — David N Spector
(74) *Attorney, Agent, or Firm* — Baker & McKenzie LLP

(57) ABSTRACT

An imaging lens includes first, second, third, and fourth lens elements arranged from an object side to an image side in the given order. The first lens element has a positive refractive power, and a convex object-side surface. The second lens element has a negative refractive power, and an image-side surface with a convex portion. The third lens element has a convex image-side surface. The fourth lens element has an object-side surface with a convex portion, and a curved image-side surface with a concave portion and a convex portion.

19 Claims, 28 Drawing Sheets

(56) References Cited

U.S. PATENT DOCUMENTS

| | | |
|---|---|---|
| 2011/0188132 A1 | 8/2011 | Yamakawa |
| 2011/0188133 A1 | 8/2011 | Yamakawa |
| 2011/0242683 A1 | 10/2011 | Yamakawa |
| 2011/0261471 A1 | 10/2011 | Taniyama |
| 2011/0299178 A1 | 12/2011 | Kitahara |
| 2012/0069449 A1 | 3/2012 | Taniyama |
| 2012/0176687 A1 | 7/2012 | Huang et al. |

FOREIGN PATENT DOCUMENTS

| | | |
|---|---|---|
| JP | 2011-227362 A | 11/2011 |
| JP | 2012-042840 | 3/2012 |
| JP | 2012-088691 A | 5/2012 |
| JP | 2013-148834 A | 8/2013 |
| JP | 2013-182132 A | 9/2013 |
| TW | I279607 | 4/2007 |
| TW | 201137429 | 11/2011 |

\* cited by examiner

FIG. 2

| lens element | surface | radius of curvature | thickness | refractive index | Abbe number | material | focal length |
|---|---|---|---|---|---|---|---|
| object | | ∞ | | | | | |
| aperture stop 2 | | ∞ | −0.100 | | | | |
| first lens element 3 | object-side surface 31 | 0.889 | 0.454 | 1.546 | 56.114 | plastic | 1.854 |
| | image-side surface 32 | 5.949 | 0.143 | | | | |
| second lens element 4 | object-side surface 41 | −2.143 | 0.271 | 1.655 | 21.448 | plastic | 3.980 |
| | image-side surface 42 | −12.623 | 0.134 | | | | |
| third lens element 5 | object-side surface 51 | −1.912 | 0.334 | 1.536 | 55.699 | plastic | 1.981 |
| | image-side surface 52 | −0.725 | 0.270 | | | | |
| fourth lens element 6 | object-side surface 61 | 1.383 | 0.323 | 1.536 | 55.699 | plastic | −2.147 |
| | image-side surface 62 | 0.577 | 0.300 | | | | |
| Optical filter 7 | object-side surface 71 | ∞ | 0.210 | | | | |
| | image side surface 72 | ∞ | 0.079 | | | | |
| Image plane 8 | | ∞ | | | | | | system focal length = 1.878mm, half field of view = 35.23°, system length = 2.519mm

| surface | 31 | 32 | 41 | 42 | 51 | 52 | 61 | 62 |
|---|---|---|---|---|---|---|---|---|
| NRADIUS | 0.4241 | 0.4965 | 0.5916 | 0.5390 | 0.7084 | 0.7042 | 1.1505 | 1.2418 |
| K | -7.4732 | 0.0000 | -20.8901 | 0.0000 | -16.7514 | -0.3405 | -7.6761 | -3.2678 |
| $a_0$ | 0.0318 | -0.0181 | -0.1205 | 0.0070 | -0.0113 | 0.0963 | -0.5637 | -0.5957 |
| $a_1$ | -0.0013 | -0.0026 | 0.0080 | -0.0041 | -0.0114 | 0.0217 | 0.2106 | 0.1071 |
| $a_2$ | 0.0002 | 0.0004 | 0.0072 | 0.0016 | 0.0049 | 0.0067 | -0.0470 | -0.0219 |
| $a_3$ | --- | --- | 0.0006 | -0.0002 | -0.0005 | 0.0006 | -0.0153 | 0.0177 |
| $a_4$ | --- | --- | --- | 0.0001 | 0.0006 | 0.0001 | -0.0199 | 0.0006 |
| $a_5$ | --- | --- | --- | | --- | --- | -0.0066 | 0.0015 |

FIG. 3

FIG. 7 system focal length=2.00mm, half field-of-view=33.46°, system length=2.643mm

| lens element | surface | radius of curvature | thickness | refractive index | Abbe number | material | focal length |
|---|---|---|---|---|---|---|---|
| object | | ∞ | | | | | |
| aperture stop 2 | | ∞ | -0.113 | | | | |
| first lens element 3 | object-side surface 31 | 0.901 | 0.431 | 1.546 | 56.114 | plastic | 1.810 |
| | image-side surface 32 | 8.438 | 0.160 | | | | |
| second lens element 4 | object-side surface 41 | -2.089 | 0.275 | 1.655 | 21.448 | plastic | -3.860 |
| | image-side surface 42 | -12.623 | 0.100 | | | | |
| third lens element 5 | object-side surface 51 | -2.017 | 0.431 | 1.536 | 55.699 | plastic | 2.044 |
| | image-side surface 52 | -0.763 | 0.309 | | | | |
| fourth lens element 6 | object-side surface 61 | 2.438 | 0.350 | 1.536 | 55.699 | plastic | -1.973 |
| | image-side surface 62 | 0.701 | 0.300 | | | | |
| Optical filter 7 | object-side surface 71 | ∞ | 0.210 | | | | |
| | image-side surface 72 | ∞ | 0.076 | | | | |
| Image plane 8 | | ∞ | | | | | |

| surface | 31 | 32 | 41 | 42 | 51 | 52 | 61 | 62 |
|---|---|---|---|---|---|---|---|---|
| NRADIUS | 0.4268 | 0.4904 | 0.5943 | 0.5370 | 0.6731 | 0.7106 | 1.1799 | 1.2605 |
| K | -7.4732 | 0.0000 | -20.8901 | 0.0000 | -16.7514 | -0.3157 | -7.6761 | -3.2678 |
| $a_0$ | 0.0312 | -0.0190 | -0.1228 | 0.0045 | -0.0218 | 0.0973 | -0.5178 | -0.5456 |
| $a_1$ | -0.0014 | -0.0038 | 0.0043 | -0.0043 | -0.0079 | 0.0164 | 0.1895 | 0.1079 |
| $a_2$ | 0.0001 | 0.0000 | 0.0068 | 0.0016 | 0.0050 | 0.0035 | -0.0437 | -0.0214 |
| $a_3$ | --- | --- | 0.0010 | -0.0001 | 0.0008 | -0.0003 | -0.0168 | 0.0135 |
| $a_4$ | --- | --- | --- | 0.0001 | 0.0006 | 0.0000 | -0.0193 | -0.0002 |
| $a_5$ | --- | --- | --- | --- | --- | --- | -0.0066 | 0.0010 |

FIG. 8

FIG. 11 system focal length=2.223mm, half field-of-view=31.14°, system length=2.880mm

| lens element | surface | radius of curvature | thickness | refractive index | Abbe number | material | focal length |
|---|---|---|---|---|---|---|---|
| object | | ∞ | | | | | |
| aperture stop 2 | | ∞ | -0.133 | | | | |
| first lens element 3 | object-side surface 31 | 0.947 | 0.471 | 1.546 | 56.114 | plastic | 1.795 |
| | image-side surface 32 | 23.344 | 0.161 | | | | |
| second lens element 4 | object-side surface 41 | -2.000 | 0.299 | 1.655 | 21.448 | plastic | -3.668 |
| | image-side surface 42 | -12.623 | 0.100 | | | | |
| third lens element 5 | object-side surface 51 | -2.235 | 0.535 | 1.536 | 55.699 | plastic | 2.057 |
| | image-side surface 52 | -0.800 | 0.314 | | | | |
| fourth lens element 6 | object-side surface 61 | 27.656 | 0.408 | 1.536 | 55.699 | plastic | 1.742 |
| | image-side surface 62 | 0.899 | 0.300 | | | | |
| Optical filter 7 | object-side surface 71 | ∞ | 0.210 | | | | |
| | image-side surface 72 | ∞ | 0.082 | | | | |
| image plane 8 | | ∞ | | | | | |

| surface | 31 | 32 | 41 | 42 | 51 | 52 | 61 | 62 |
|---|---|---|---|---|---|---|---|---|
| NRADIUS | 0.4380 | 0.4945 | 0.6041 | 0.5446 | 0.6486 | 0.7167 | 1.2020 | 1.2858 |
| K | -7.4732 | 0.0000 | -20.8901 | 0.0000 | -16.7514 | -0.2798 | -7.6761 | -3.2678 |
| $a_0$ | 0.0294 | -0.0167 | -0.1221 | 0.0037 | -0.0317 | 0.0941 | -0.3158 | -0.5280 |
| $a_1$ | -0.0012 | -0.0039 | -0.0072 | -0.0049 | -0.0062 | 0.0112 | 0.1524 | 0.1019 |
| $a_2$ | 0.0001 | -0.0002 | 0.0026 | 0.0013 | 0.0046 | 0.0031 | -0.0385 | -0.0187 |
| $a_3$ | --- | --- | 0.0005 | 0.0000 | 0.0011 | 0.0001 | -0.0226 | 0.0120 |
| $a_4$ | --- | --- | --- | 0.0001 | 0.0004 | 0.0001 | -0.0186 | -0.0002 |
| $a_5$ | --- | --- | --- | --- | --- | --- | -0.0060 | 0.0010 |

FIG. 12

FIG. 15 system focal length=1.999mm , half field-of-view=33.83°, system length=2.608mm

| lens element | surface | radius of curvature | thickness | refractive index | Abbe number | material | focal length |
|---|---|---|---|---|---|---|---|
| object | | ∞ | | | | | |
| aperture stop 2 | | ∞ | −0.115 | | | | |
| first lens element 3 | object-side surface 31 | 0.890 | 0.510 | 1.546 | 56.114 | plastic | 1.905 |
| | image-side surface 32 | 4.932 | 0.130 | | | | |
| second lens element 4 | object-side surface 41 | −2.299 | 0.179 | 1.655 | 21.448 | plastic | −4.320 |
| | image-side surface 42 | −12.623 | 0.100 | | | | |
| third lens element 5 | object-side surface 51 | −1.777 | 0.491 | 1.536 | 55.699 | plastic | 1.985 |
| | image-side surface 52 | −0.730 | 0.228 | | | | |
| fourth lens element 6 | object-side surface 61 | 0.689 | 0.178 | 1.536 | 55.699 | plastic | −2.443 |
| | image-side surface 62 | 0.411 | 0.300 | | | | |
| Optical filter 7 | object-side surface 71 | ∞ | 0.210 | | | | |
| | image-side surface 72 | ∞ | 0.284 | | | | |
| Image plane 8 | | ∞ | | | | | |

| surface | 31 | 32 | 41 | 42 | 51 | 52 | 61 | 62 |
|---|---|---|---|---|---|---|---|---|
| NRADIUS | 0.4244 | 0.5160 | 0.5951 | 0.5008 | 0.6250 | 0.7024 | 1.0997 | 1.1196 |
| K | -7.4732 | 0.0000 | -20.8901 | 0.0000 | -16.7514 | -0.3440 | -7.6761 | -3.4935 |
| $a_0$ | 0.0318 | -0.0156 | -0.1120 | 0.0017 | -0.0122 | 0.0940 | -0.6902 | -0.6941 |
| $a_1$ | -0.0012 | -0.0016 | 0.0111 | -0.0041 | -0.0084 | 0.0247 | 0.2492 | 0.1166 |
| $a_2$ | 0.0001 | 0.0011 | 0.0070 | 0.0020 | 0.0005 | 0.0063 | -0.0457 | -0.0203 |
| $a_3$ | --- | --- | -0.0008 | -0.0004 | -0.0026 | 0.0011 | -0.0187 | 0.0153 |
| $a_4$ | --- | --- | --- | 0.0000 | -0.0004 | -0.0002 | -0.0189 | -0.0008 |
| $a_5$ | --- | --- | --- | --- | --- | --- | -0.0041 | 0.0014 |

| system focal length=1.792mm , half field-of-view=36.66°, system length=2.486mm | | | | | | |
|---|---|---|---|---|---|---|
| lens element | surface | radius of curvature | thickness | refractive index | Abbe number | material | focal length |
| object | | ∞ | | | | | |
| aperture stop 2 | | ∞ | -0.087 | | | | |
| first lens element 3 | object-side surface 31 | 0.883 | 0.190 | 1.546 | 56.114 | plastic | 2.027 |
| | image-side surface 32 | 4.035 | 0.400 | | | | |
| second lens element 4 | object-side surface 41 | -2.263 | 0.222 | 1.655 | 21.448 | plastic | -4.245 |
| | image-side surface 42 | -12.623 | 0.100 | | | | |
| third lens element 5 | object-side surface 51 | -1.689 | 0.454 | 1.536 | 55.699 | plastic | 1.888 |
| | image-side surface 52 | -0.692 | 0.103 | | | | |
| fourth lens element 6 | object-side surface 61 | 0.642 | 0.266 | 1.536 | 55.699 | plastic | -3.251 |
| | image-side surface 62 | 0.401 | 0.300 | | | | |
| Optical filter 7 | object-side surface 71 | ∞ | 0.210 | | | | |
| | image-side surface 72 | ∞ | 0.241 | | | | |
| Image plane 8 | | ∞ | | | | | |

| surface | 31 | 32 | 41 | 42 | 51 | 52 | 61 | 62 |
|---|---|---|---|---|---|---|---|---|
| NRADIUS | 0.4267 | 0.5021 | 0.5949 | 0.5111 | 0.6749 | 0.7092 | 1.2210 | 1.2204 |
| K | -7.7561 | 0.0000 | -20.8901 | 0.0000 | -16.7514 | -0.3287 | -7.6761 | -3.0928 |
| $a_0$ | 0.0312 | -0.0132 | -0.1162 | -0.0062 | -0.0122 | 0.0835 | -0.5617 | -0.6906 |
| $a_1$ | -0.0020 | -0.0036 | 0.0100 | -0.0035 | -0.0103 | 0.0222 | 0.1442 | 0.0916 |
| $a_2$ | 0.0000 | -0.0007 | 0.0054 | 0.0014 | 0.0063 | 0.0051 | -0.0571 | -0.0286 |
| $a_3$ | --- | --- | 0.0011 | -0.0003 | -0.0031 | 0.0006 | -0.0057 | 0.0133 |
| $a_4$ | --- | --- | --- | 0.0000 | 0.0004 | -0.0009 | -0.0123 | 0.0010 |
| $a_5$ | --- | --- | --- | --- | --- | --- | -0.0091 | 0.0015 |

| lens element | surface | radius of curvature | thickness | refractive index | Abbe number | material | focal length |
|---|---|---|---|---|---|---|---|
| \multicolumn{8}{|l|}{system focal length=2.175mm, half field-of-view=31.57°, system length=2.805mm} |
| object | | ∞ | | | | | |
| aperture stop 2 | | ∞ | -0.125 | | | | |
| first lens element 3 | object-side surface 31 | 0.957 | 0.457 | 1.546 | 56.114 | plastic | 1.794 |
| | image-side surface 32 | 34.672 | 0.155 | | | | |
| second lens element 4 | object-side surface 41 | -2.048 | 0.304 | 1.655 | 21.448 | plastic | -3.774 |
| | image-side surface 42 | -12.623 | 0.050 | | | | |
| third lens element 5 | object-side surface 51 | -2.707 | 0.583 | 1.536 | 55.699 | plastic | 2.053 |
| | image-side surface 52 | -0.841 | 0.340 | | | | |
| fourth lens element 6 | object-side surface 61 | 40.000 | 0.386 | 1.536 | 55.699 | plastic | -1.699 |
| | image-side surface 62 | 0.888 | 0.300 | | | | |
| Optical filter 7 | object-side surface 71 | ∞ | 0.210 | | | | |
| | image-side surface 72 | ∞ | 0.065 | | | | |
| Image plane 8 | | ∞ | | | | | |

| surface | 31 | 32 | 41 | 42 | 51 | 52 | 61 | 62 |
|---|---|---|---|---|---|---|---|---|
| NRADIUS | 0.4406 | 0.4865 | 0.5986 | 0.5427 | 0.6814 | 0.7145 | 1.2055 | 1.2823 |
| K | -7.4732 | 0.0000 | -20.8901 | 0.0000 | -16.7514 | -0.2796 | -7.6761 | -3.2678 |
| $a_0$ | 0.0290 | -0.0183 | -0.1260 | 0.0040 | -0.0173 | 0.0917 | -0.3477 | -0.5072 |
| $a_1$ | -0.0013 | -0.0042 | -0.0068 | -0.0057 | -0.0094 | 0.0145 | 0.1721 | 0.1031 |
| $a_2$ | 0.0000 | -0.0003 | 0.0037 | 0.0010 | 0.0045 | 0.0021 | -0.0430 | -0.0228 |
| $a_3$ | --- | --- | 0.0011 | 0.0000 | 0.0011 | -0.0002 | -0.0197 | 0.0116 |
| $a_4$ | --- | --- | --- | 0.0000 | 0.0004 | 0.0000 | -0.0187 | -0.0007 |
| $a_5$ | --- | --- | --- | --- | --- | --- | -0.0055 | 0.0012 |

FIG. 24

| relationship | first preferred embodiment | second preferred embodiment | third preferred embodiment | fourth preferred embodiment | fifth preferred embodiment | sixth preferred embodiment |
|---|---|---|---|---|---|---|
| EFL | 1.878 | 2.000 | 2.223 | 1.999 | 1.792 | 2.175 |
| $AG_{12}$ | 0.143 | 0.160 | 0.161 | 0.130 | 0.400 | 0.155 |
| $AG_{23}$ | 0.134 | 0.100 | 0.100 | 0.100 | 0.100 | 0.050 |
| AAG | 0.547 | 0.569 | 0.575 | 0.458 | 0.603 | 0.544 |
| ALT | 1.383 | 1.487 | 1.713 | 1.357 | 1.132 | 1.730 |
| $CT_2$ | 0.271 | 0.275 | 0.299 | 0.179 | 0.222 | 0.304 |
| $EFL/AG_{23}$ | 13.999 | 19.999 | 22.230 | 19.990 | 17.920 | 43.494 |
| $AAG/CT_2$ | 2.017 | 2.067 | 1.924 | 2.563 | 2.714 | 1.790 |
| $ALT/CT_2$ | 5.100 | 5.400 | 5.729 | 7.600 | 5.100 | 5.690 |
| $AG_{12}/AG_{23}$ | 1.068 | 1.600 | 1.610 | 1.300 | 4.000 | 3.098 |

FIG. 26

IMAGING LENS AND ELECTRONIC APPARATUS HAVING THE SAME

CROSS-REFERENCE TO RELATED APPLICATION

This application claims priority to Taiwanese Application No. 101130992, filed on Aug. 27, 2012.

BACKGROUND OF THE INVENTION

1. Field of the Invention

The present invention relates to an imaging lens and an electronic apparatus, more particularly to an imaging lens having four lens elements and an electronic apparatus having the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

US patent application publication no. 2011/0299178 discloses a conventional imaging lens with four lens elements, including a first lens element with negative refractive power, a second lens element with positive refractive power, a third lens element with an image-side surface that is concave in vicinities of an optical axis and a periphery thereof, and a fourth lens element with an image-side surface that is convex in vicinities of an optical axis and a periphery thereof. The design proposed in the publication is unable to reduce overall system length while keeping good optical performance.

Each of US patent application publication nos. 2011/0242683, 2011/0188132, and 2011/0188133 discloses a conventional imaging lens with four lens elements, including first and second lens elements with negative refractive power and a relatively large gap therebetween. The designs proposed in these publications are unable to achieve effective reduction of the system length.

Each of US patent application publication nos. 2011/0261471 and 2012/0176687 discloses a conventional imaging lens with four lens elements, including a first lens element with positive refractive power and a second lens element with negative refractive power. However, the entire image-side surface of the second lens element is a concave surface, resulting in relatively large gap between the second and third lens elements, which does not favor reduction of the system length.

Each of Taiwanese patent no. TWI279607, Taiwanese application publication no. 201137429, U.S. Pat. No. 7,755,853, U.S. Pat. No. 7,692,877, U.S. Pat. No. 8,089,704, US patent application publication nos. US20110058262, US20120069449, and Japanese patent application publication nos. JP2011064989, JP2012042840 discloses a conventional imaging lens, which is likewise not able to achieve reduction of the system length without compromising optical performance.

Thus, it is apparent that the current trend in development of imaging systems for portable electronic devices focuses on reducing overall lengths of the imaging systems. However, optical performances and imaging qualities of the imaging systems may be compromised as the overall lengths are reduced.

SUMMARY OF THE INVENTION

Therefore, an object of the present invention is to provide an imaging lens having a shorter overall length while maintaining good optical performance.

According to one aspect of the present invention, an imaging lens comprises first, second, third, and fourth lens elements arranged from an object side to an image side in the given order. Each of the first, second, third, and fourth lens elements has an object-side surface facing toward the object side and an image-side surface facing toward the image side.

The first lens element has a positive refractive power, and the object-side surface thereof is a convex surface.

The second lens element has a negative refractive power, and the image-side surface thereof has a convex portion in a vicinity of a periphery of the imaging lens.

The image-side surface of the third lens element is a convex surface.

The object-side surface of the fourth lens element has a convex portion in a vicinity of an optical axis of the imaging lens.

The image-side surface of the fourth lens element is a curved surface and has a concave portion in a vicinity of the optical axis of the imaging lens, and a convex portion in a vicinity of a periphery of the fourth lens element.

The imaging lens does not include any lens element with refractive power other than the first, second, third, and fourth lens elements.

Another object of the present invention is to provide an electronic apparatus having an imaging lens with four lens elements.

According to another aspect of the present invention, an electronic apparatus includes a housing and an imaging module. The imaging module is disposed in the housing, and includes the imaging lens of the present invention, a barrel on which the imaging lens is disposed, a seat unit on which the barrel is disposed, and an image sensor disposed at the image side and operatively associated with the imaging lens for capturing images.

BRIEF DESCRIPTION OF THE DRAWINGS

Other features and advantages of the present invention will become apparent in the following detailed description of the preferred embodiments with reference to the accompanying drawings, of which:

FIG. 2 shows values of some optical parameters corresponding to the imaging lens of the first preferred embodiment;

FIG. 3 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 26 is a table that lists values of parameters of other optical relationships corresponding to the imaging lenses of the first to sixth preferred embodiments;

DETAILED DESCRIPTION OF THE PREFERRED EMBODIMENTS

Figure 1:
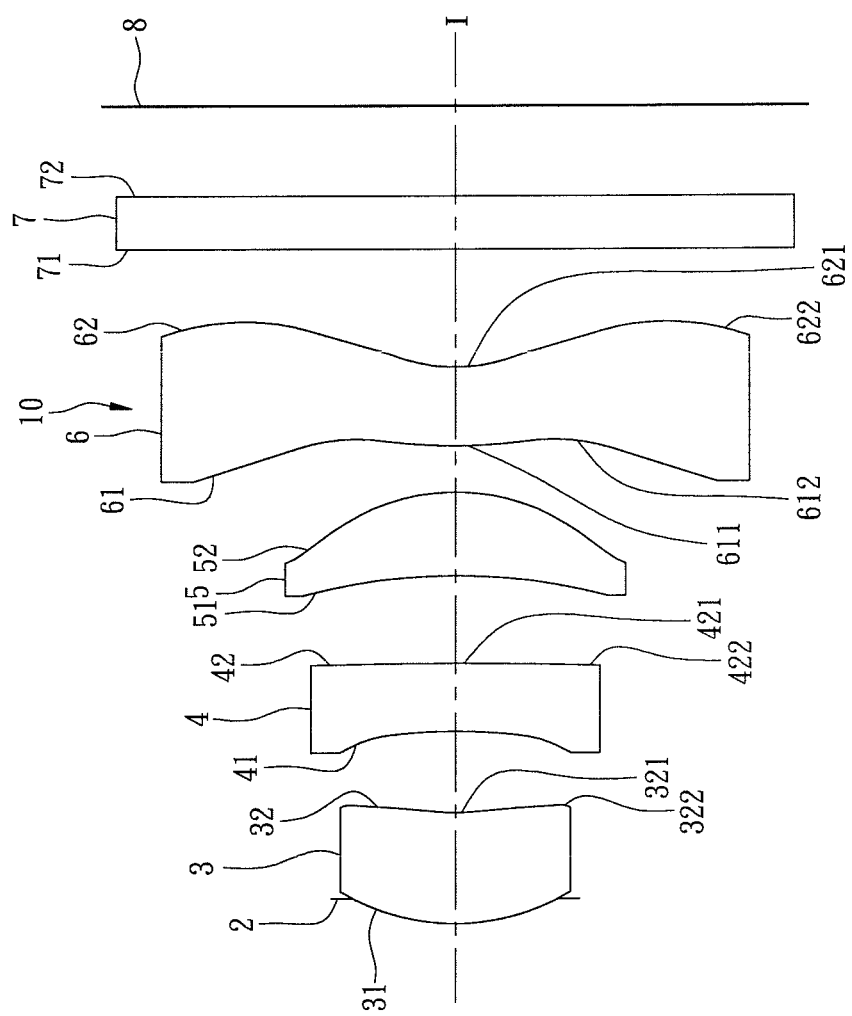
FIG. 1 is a schematic diagram that illustrates the first preferred embodiment of an imaging lens according to the present invention.

Before the present invention is described in greater detail, it should be noted that like elements are denoted by the same reference numerals throughout the disclosure.

Referring to FIG. 1, an imaging lens 10 of the present invention includes an aperture stop 2, first, second, third, and fourth lens elements 3-6, and an optical filter 7 arranged in the given order along an optical axis (I) from an object side to an image side. The optical filter 7 is an infrared cut filter for selectively absorbing infrared light to thereby reduce imperfection of images formed at an image plane 8.

Each of the first, second, third, and fourth lens elements 3-6 and the optical filter 7 has an object-side surface 31, 41, 51, 61, 71 facing toward the object side, and an image-side surface 32, 42, 52, 62, 72 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 8. Each of the object-side surfaces 31, 41, 51, 61 and the image-side surfaces 32, 42, 52, 62 is aspherical and has a center point coinciding with the optical axis (I).

During manufacture, the first lens element 3 may be formed with a peripheral extending portion, which may be flat or stepped in shape. In terms of function, while the object-side and image-side surfaces 31, 32 are configured to enable passage of light through the first lens element 3, the extending portion merely serves to provide the function of installation and does not contribute toward passage of light through the first lens element 3. The other lens elements 4-6 may also be formed with extending portions similar to that of the first lens element 3.

The lens elements 3-6 are made of plastic material in this embodiment, and at least one of them may be made of other materials in other embodiments.

In the first preferred embodiment, which is depicted in FIG. 1, the first lens element 3 has a positive refractive power, the object-side surface 31 thereof is a convex surface, and the image-side surface 32 thereof is a curved surface that has a concave portion 321 in a vicinity of the optical axis (I) and a convex portion 322 in a vicinity of a periphery of the first lens element 3.

The second lens element 4 has a negative refractive power, the object-side surface 41 thereof is a concave surface, and the image-side surface 42 thereof is a convex surface that has a convex portion 421 in a vicinity of the optical axis (I), and another convex portion 422 in a vicinity of a periphery of the second lens element 4.

The third lens element 5 has a positive refractive power, the object-side surface 51 thereof is a concave surface, and the image-side surface 52 thereof is a convex surface.

The fourth lens element 6 has a negative refractive power, the object-side surface 61 thereof is a curved surface that has a convex portion 611 in a vicinity of the optical axis (I) and a concave portion 612 in a vicinity of a periphery of the fourth lens element 6, and the image-side surface 62 thereof is a curved surface that has a concave portion 621 in a vicinity of the optical axis (I) and a convex portion 622 in a vicinity of the periphery of the fourth lens element 6.

Shown in FIG. 2 is a table that lists values of some optical parameters corresponding to the surfaces 31-61, 32-62 of the first preferred embodiment. The imaging lens 10 has an overall system focal length of 1.878 mm, a half field-of-view (HFOV) of 35.23°, and a system length of 2.519 mm.

Figure 5:
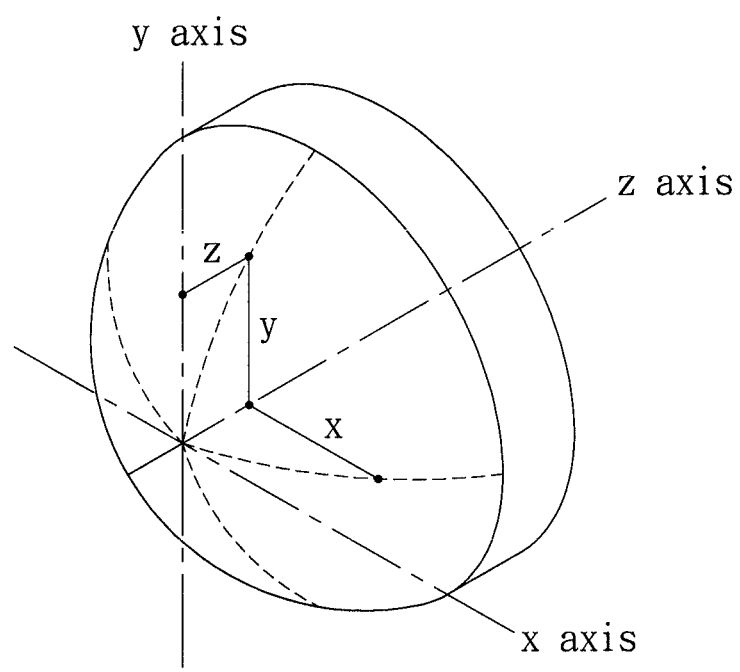
FIG. 5 is a schematic diagram illustrating spatial axes.

In this embodiment, each of the object-side surfaces 31-61 and the image-side surfaces 32-62 is aspherical, and satisfies the optical relationship of $$z = \frac{cr^2}{1 - \sqrt{1-(1+K)c^2r^2}} + u^4 \sum_{m=0}^{13} a_m Q_m^{con}(u^2) \quad (1)$$

where:

z represents a depth of an aspherical surface, which is defined as a perpendicular distance between an arbitrary point on the aspherical surface and a tangent plane at a vertex of the aspherical surface at the optical axis (I);

c represents a vertex curvature of the aspherical surface;

K represents a conic constant;

r represents a radial distance, and satisfies a relationship of $r=\sqrt{x^2+y^2}$;

u represents $r/r_n$, where $r_n$ represents a normalization radius (NRADIUS);

$a_m$ represents an $m^{th}$ $Q^{con}$ coefficient; and $Q_m^{con}$ represents an $m^{th}$ $W^{con}$ polynomial, where x, y, z has a relationship therebetween, as shown in FIG. 5, and the z axis is the optical axis (I).

Shown in FIG. 3 is a, table that lists values of some optical parameters of the aforementioned optical relationship (1) corresponding to the first preferred embodiment.

Relationships among some of the aforementioned optical parameters corresponding to the first preferred embodiment are as follows:

$EFL/AG_{23}=13.999$ $AAG/CT_2=2.017$ $ALT/CT_2=5.100$ $AG_{12}/AG_{23}=1.068$ where:

ALT represents a sum of a distance between the object-side surface 31 and the image-side surface 32 of the first lens element 3 at the optical axis (I), a distance between the object-side surface 41 and the image-side surface 42 of the second lens element 4 at the optical axis (I), a distance between the object-side surface 51 and the image-side surface 52 of the third lens element 5 at the optical axis (I), and a distance between the object-side surface 61 and the image-side surface 62 of the fourth lens element 6 at the optical axis (I);

$CT_2$ represents a distance between the object-side surface 41 and the image-side surface 42 of the second lens element 4 at the optical axis (I);

AAG represents a sum of a distance between the image-side surface 32 of the first lens element 3 and the object-side surface 41 of the second lens element 4 at the optical axis (I), a distance between the image-side 42 surface of the second lens element 4 and the object-side surface 51 of the third lens element 5 at the optical axis (I), and a distance between the image-side surface 52 of the third lens element 5 and the object-side surface 61 of the fourth lens element 6 at the optical axis (I);

$AG_{12}$ represents a distance between the image-side surface 32 of the first lens element 3 and the object-side surface 41 of the second lens element 4 at the optical axis (I);

$AG_{23}$ represents a distance between the image-side surface 42 of the second lens element 4 and the object-side surface 51 of the third lens element 5 at the optical axis (I);

BFL represents a distance between the image-side surface 62 of the fourth lens element 6 and the image plane 8 of the imaging lens 10 at the optical axis (I); and EFL (effective focal length) represents a system focal length of the imaging lens 10.

FIGS. 4(a) to 4(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

Figure 4:
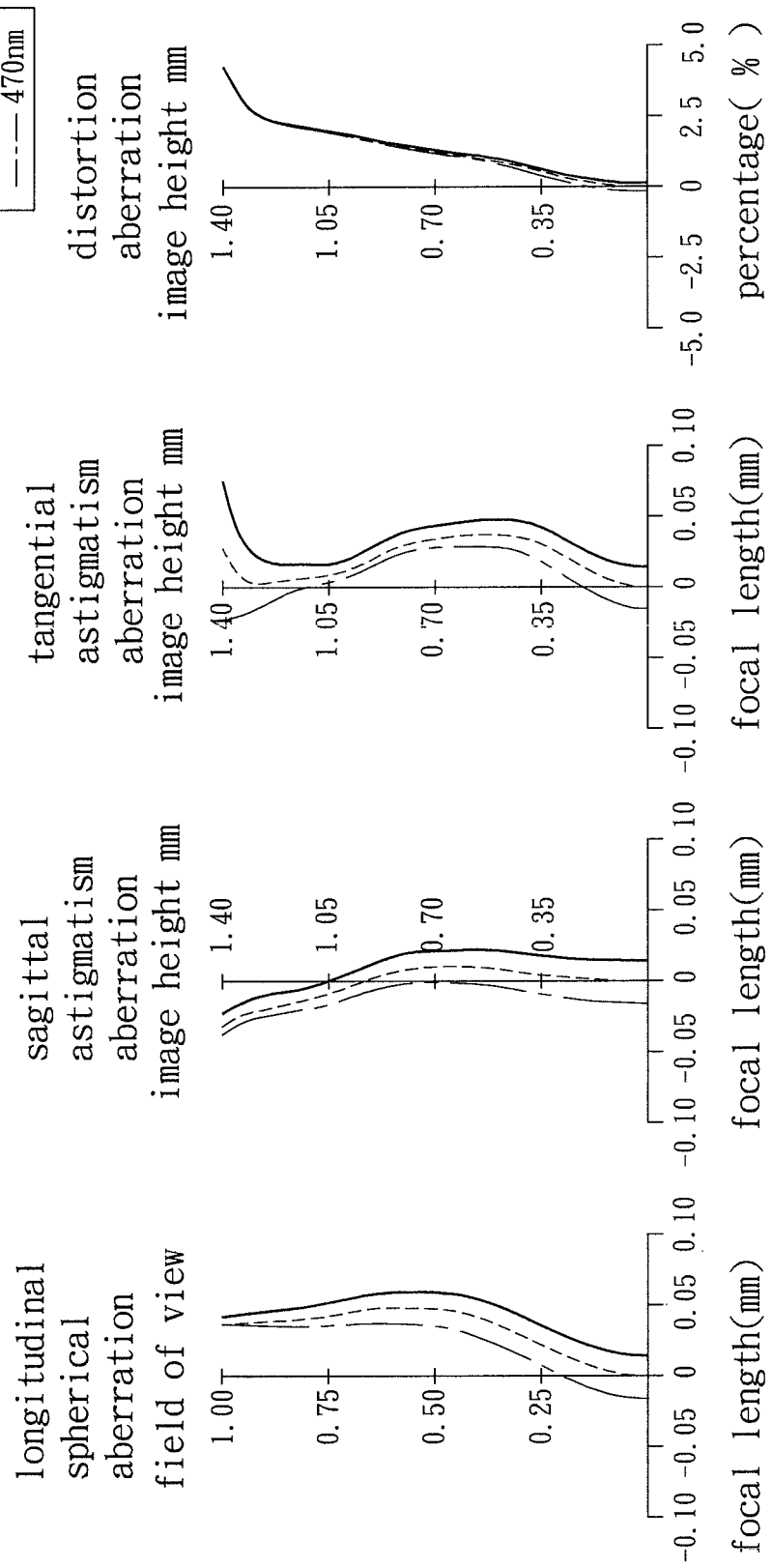
FIGS. 4(a) to 4(d) show different optical characteristics of the imaging lens of the first preferred embodiment.

It can be understood from FIG. 4(a) that, since each of the curves corresponding to longitudinal spherical aberration has a focal length at each field of view (indicated by the vertical axis) that falls within the range of ±0.06 mm, the first preferred embodiment is able to achieve a relatively low spherical aberration at each of the wavelengths. Furthermore, since a deviation in focal length among the curves at each field of view does not exceed the range of ±0.02 mm, the first preferred embodiment has a relatively low chromatic aberration.

It can be understood from FIGS. 4(b) and 4(c) that, since each of the curves falls within the range of ±0.08 mm of focal length, and each of the curves corresponding to sagittal astigmatism aberration falls within the range of ±0.04 mm of focal length, the first preferred embodiment has a relatively low optical aberration.

Moreover, as shown in FIG. 4(d), since each of the curves corresponding to distortion aberration falls within the range of ±5%, the first preferred embodiment is able to meet requirements in imaging quality of most optical systems.

In view of the above, even with the system length reduced down to below 3 mm, the imaging lens 3 of the first preferred embodiment is still able to achieve a relatively good optical performance.

Figure 6:
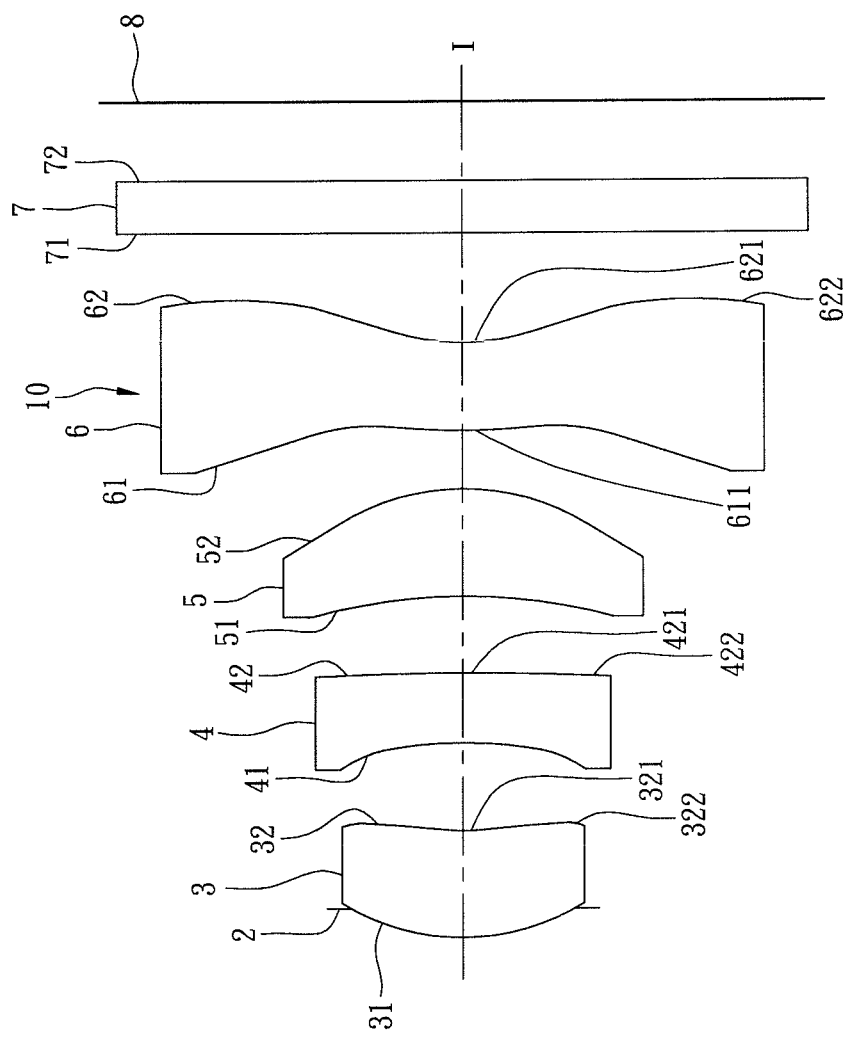
FIG. 6 is a schematic diagram that illustrates the second preferred embodiment of an imaging lens according to the present invention.
Figure 9:
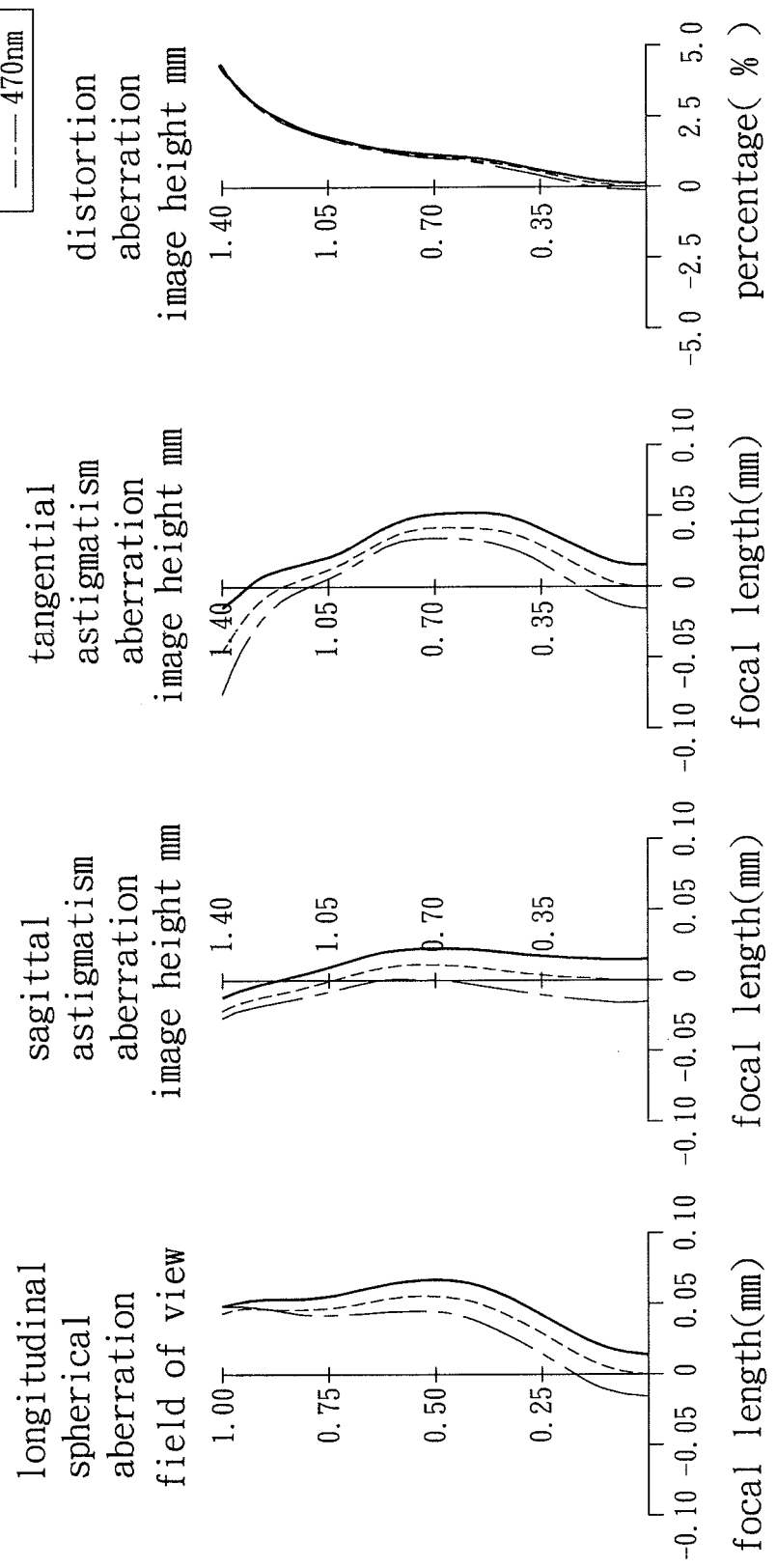
FIGS. 9(a) to 9(d) show different optical characteristics of the imaging lens of the second preferred embodiment.

FIG. 6 illustrates the second preferred embodiment of an imaging lens 10 according to the present invention, which has a configuration similar to the first preferred embodiment.

Shown in FIG. 7 is a table that lists values of some optical parameters corresponding to the surfaces 31-61, 32-62 of the second preferred embodiment. The imaging lens 10 has an overall system focal length of 2.00 mm, an HFOV of 33.46°, and a system length of 2.643 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

$EFL/AG_{23}=19.999$ $AAG/CT_2=2.067$ $ALT/CT_2=5.400$ $AG_{12}/AG_{23}=1.600$

FIGS. 9(a) to 9(d) show simulation results corresponding to longitudinal spherical aberration, sagittal astigmatism aberration, tangential astigmatism aberration, and distortion aberration of the second preferred embodiment, respectively. It can be understood from FIGS. 9(a), 9(b), 9(c) and 9(d) that the second preferred embodiment is able to achieve a relatively good optical performance even with the system length reduced down to below 3 mm.

Figure 10:
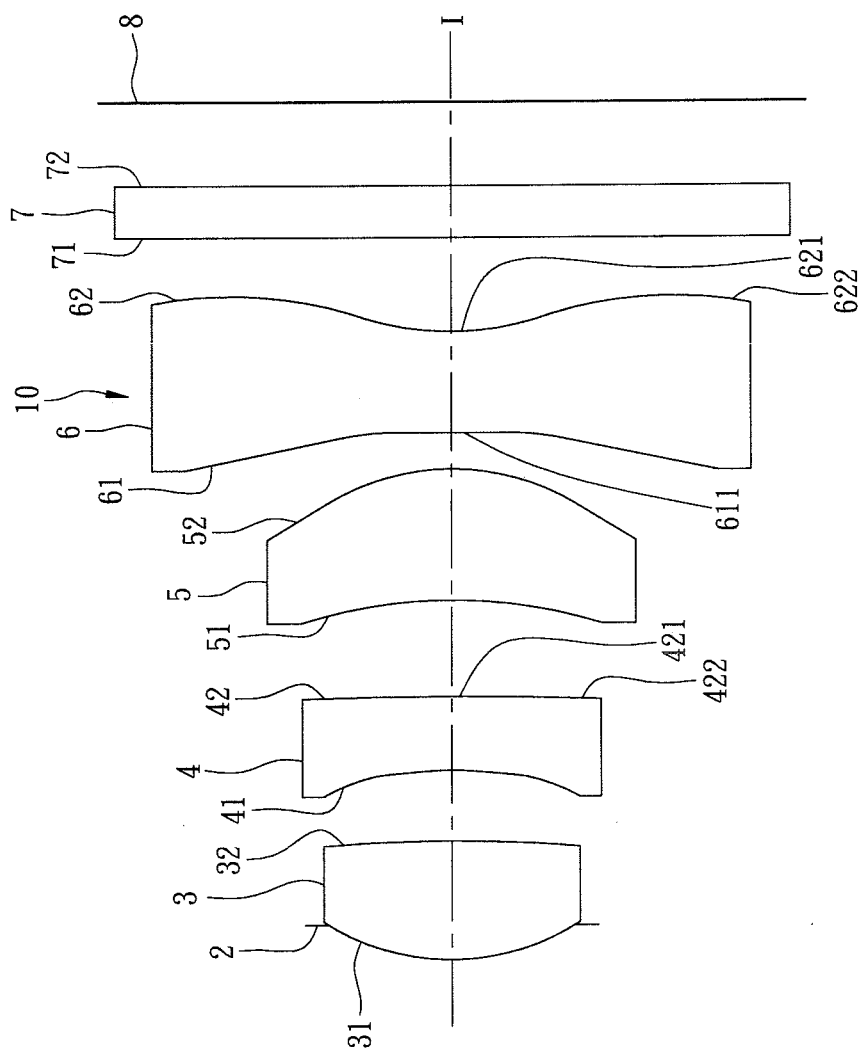
FIG. 10 is a schematic diagram that illustrates the third preferred embodiment of an imaging lens according to the present invention.
Figure 13:
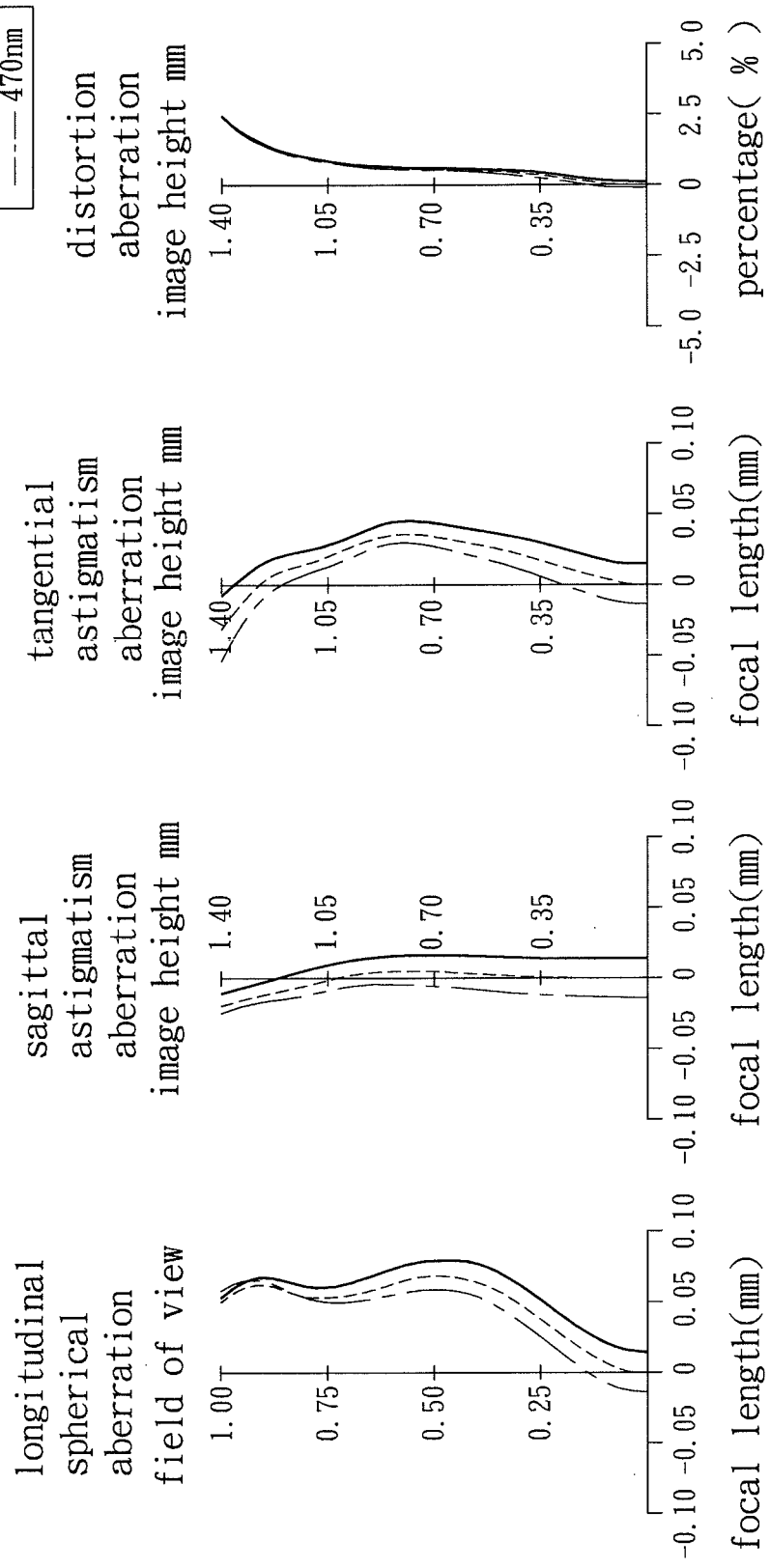
FIGS. 13(a) to 13(d) show different optical characteristics of the imaging lens of the third preferred embodiment.

Referring to FIG. 10, the difference between the first and third preferred embodiments resides in that:

The image-side surface 32 of the first lens element 3 is a convex surface.

Shown in FIG. 11 is a table that lists values of some optical parameters corresponding to the surfaces 31-61, 32-62 of the third preferred embodiment. The imaging lens 10 has an overall system focal length of 2.223 mm, an HFOV of 31.14°, and a system length of 2.880 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

$EFL/AG_{23}=22.230$ $AAG/CT_2=1.924$ $ALT/CT_2=5.729$ $AG_{12}/AG_{23}=1.610$

FIGS. 13(a) to 13(d) show simulation results corresponding to longitudinal spherical aberration, sagittal astigmatism aberration, tangential astigmatism aberration, and distortion aberration of the third preferred embodiment, respectively. It can be understood from FIGS. 13(a), 13(b), 13(c) and 13(d) that the third preferred embodiment is likewise able to achieve a relatively good optical performance even with the system length reduced down to below 3 mm.

Figure 14:
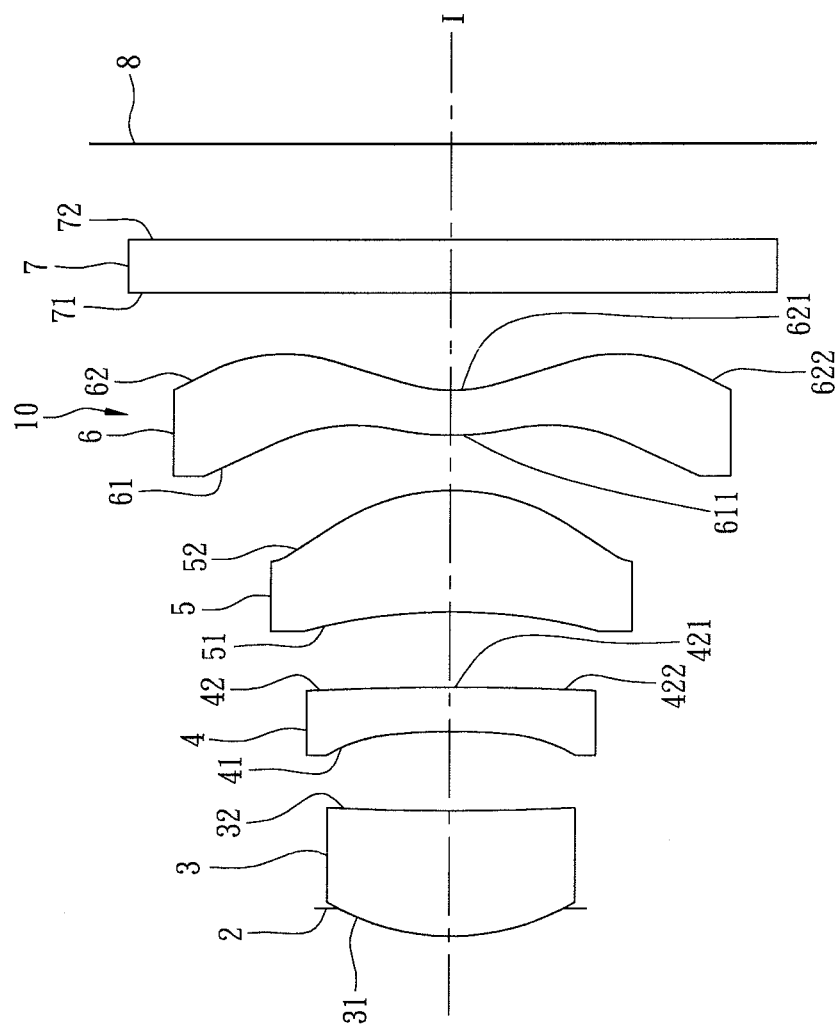
FIG. 14 is a schematic diagram that illustrates the fourth preferred embodiment of an imaging lens according to the present invention.
Figures 17A, 17B, 17C, 17D:
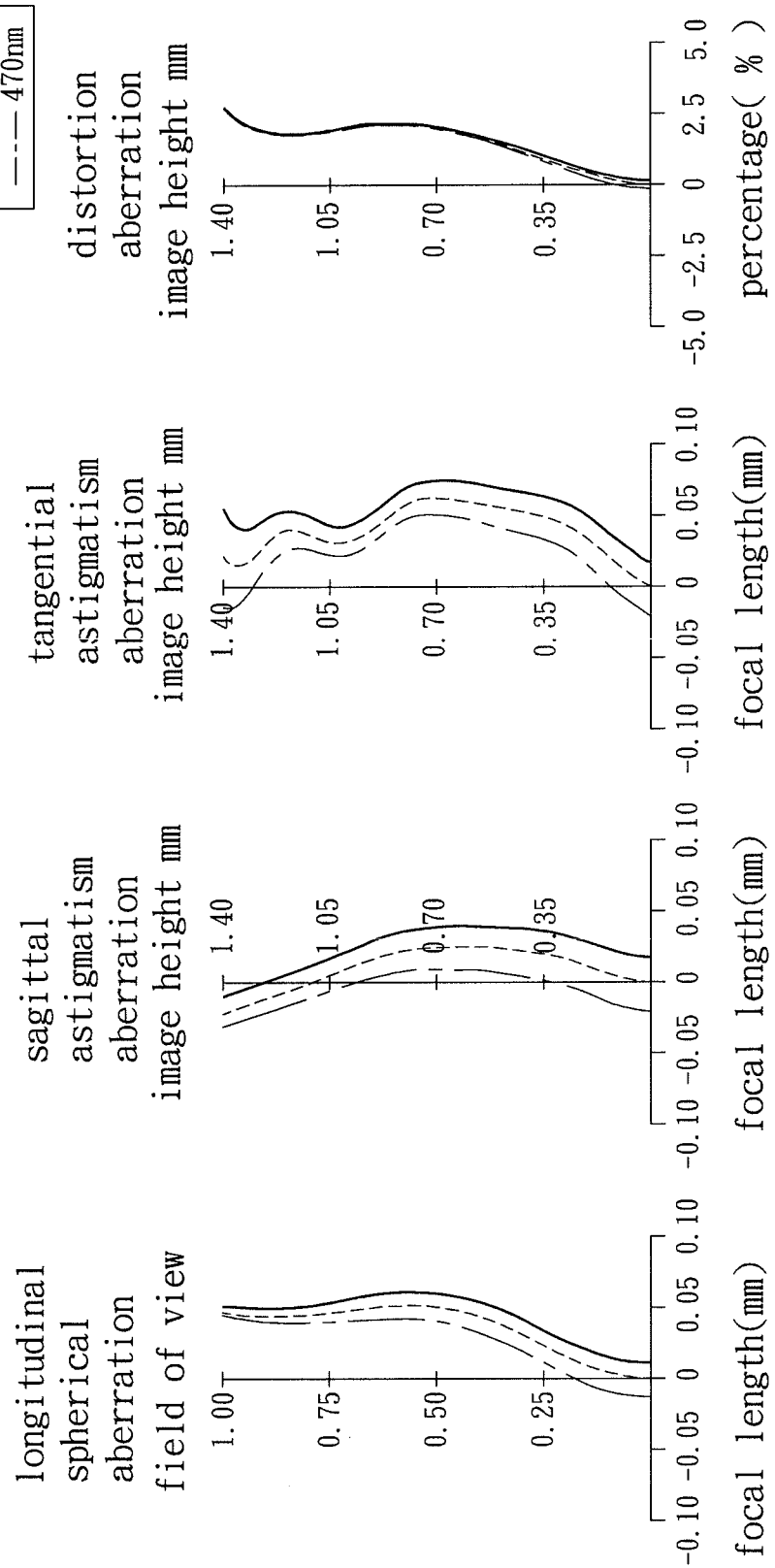
FIGS. 17(a) to 17(d) show different optical characteristics of the imaging lens of the fourth preferred embodiment.

Referring to FIG. 14, the difference between the first and fourth preferred embodiments resides in that:

The image-side surface 32 of the first lens element 3 is a concave surface.

Shown in FIG. 15 is a table that lists values of some optical parameters corresponding to the surfaces 31-61, 32-62 of the fourth preferred embodiment. The imaging lens 10 has an overall system focal length of 1.999 mm, an HFOV of 33.83°, and a system length of 2.608 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

$EFL/AG_{23}=19.990$ $AAG/CT_2=2.563$ $ALT/CT_2=7.600$ $AG_{12}/AG_{23}=1.300$

FIGS. 17(a) to 17(d) show simulation results corresponding to longitudinal spherical aberration, sagittal astigmatism aberration, tangential astigmatism aberration, and distortion aberration of the fourth preferred embodiment, respectively. It can be understood from FIGS. 17(a), 17(b), 17(c) and 17(d) that the fourth preferred embodiment is likewise able to achieve a relatively good optical performance even with the system length reduced down to below 3 mm.

Figure 18:
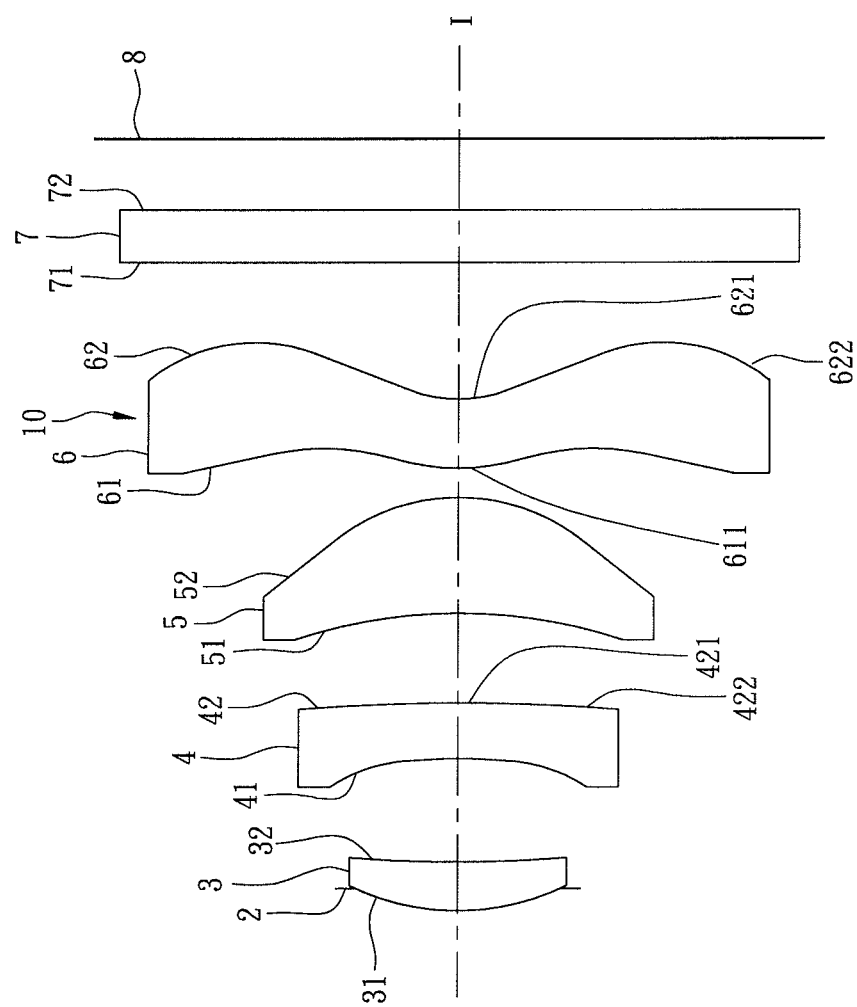
FIG. 18 is a schematic diagram that illustrates the fifth preferred embodiment of an imaging lens according to the present invention.
Figures 21A, 21B, 21C, 21D:
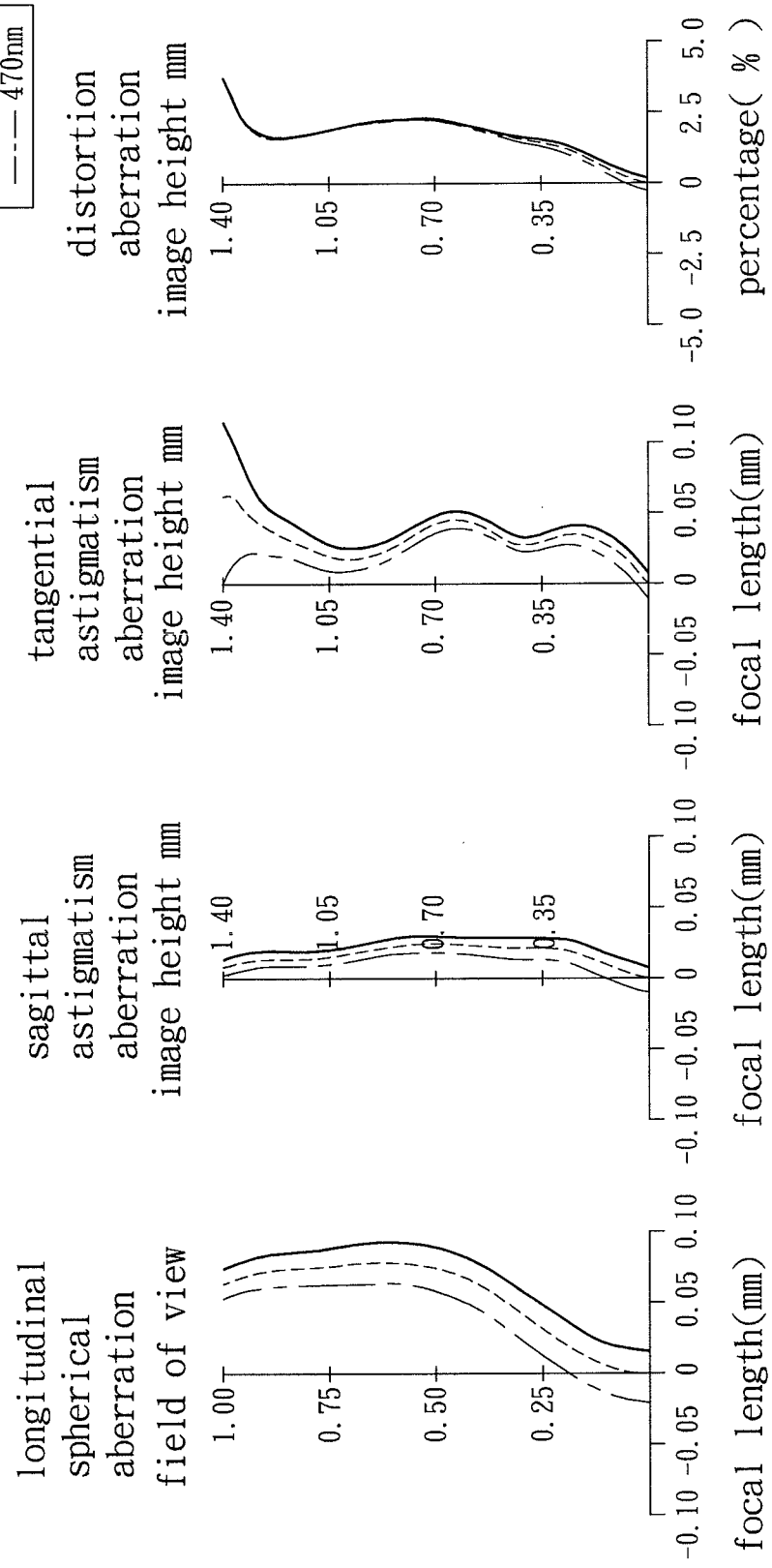
FIGS. 21(a) to 21(d) show different optical characteristics of the imaging lens of the fifth preferred embodiment.

Referring to FIG. 18, the difference between the first and fifth preferred embodiments resides in that:

The image-side surface 32 of the first lens element 3 is a concave surface.

Shown in FIG. 19 is a table that lists values of some optical parameters corresponding to the surfaces 31-61, 32-62 of the fifth preferred embodiment. The imaging lens 10 has an overall system focal length of 1.792 mm, an HFOV of 36.66°, and a system length of 2.486 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

$EFL/AG_{23}=17.920$ $AAG/CT_2=2.714$ $ALT/CT_2=5.100$ $AG_{12}/AG_{23}=4.000$

FIGS. 21(a) to 21(d) show simulation results corresponding to longitudinal spherical aberration, sagittal astigmatism aberration, tangential astigmatism aberration, and distortion aberration of the fifth preferred embodiment, respectively. It can be understood from FIGS. 21(a), 21(b), 21(c) and 21(d) that the fifth preferred embodiment is likewise able to achieve a relatively good optical performance even with the system length reduced down to below 3 mm.

Figure 22:
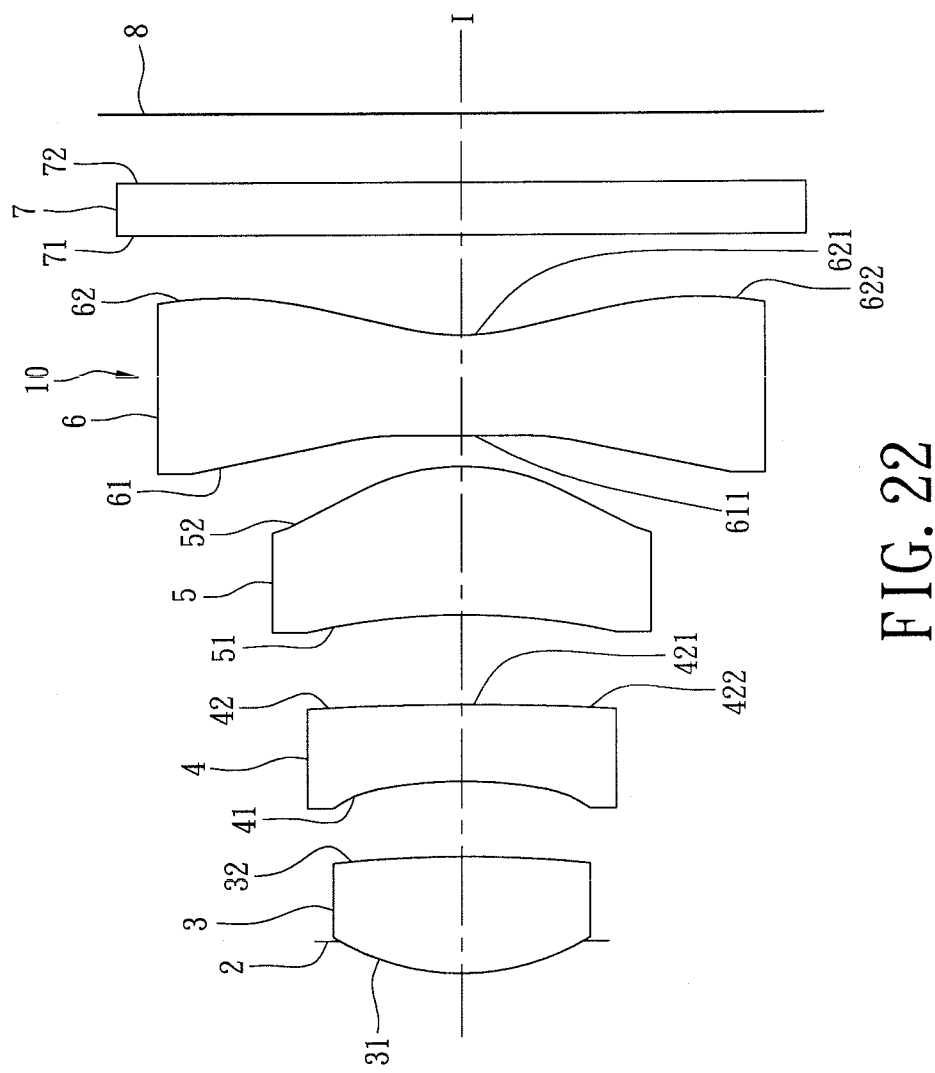
FIG. 22 is a schematic diagram that illustrates the sixth preferred embodiment of an imaging lens according to the present invention.
Figure 25:
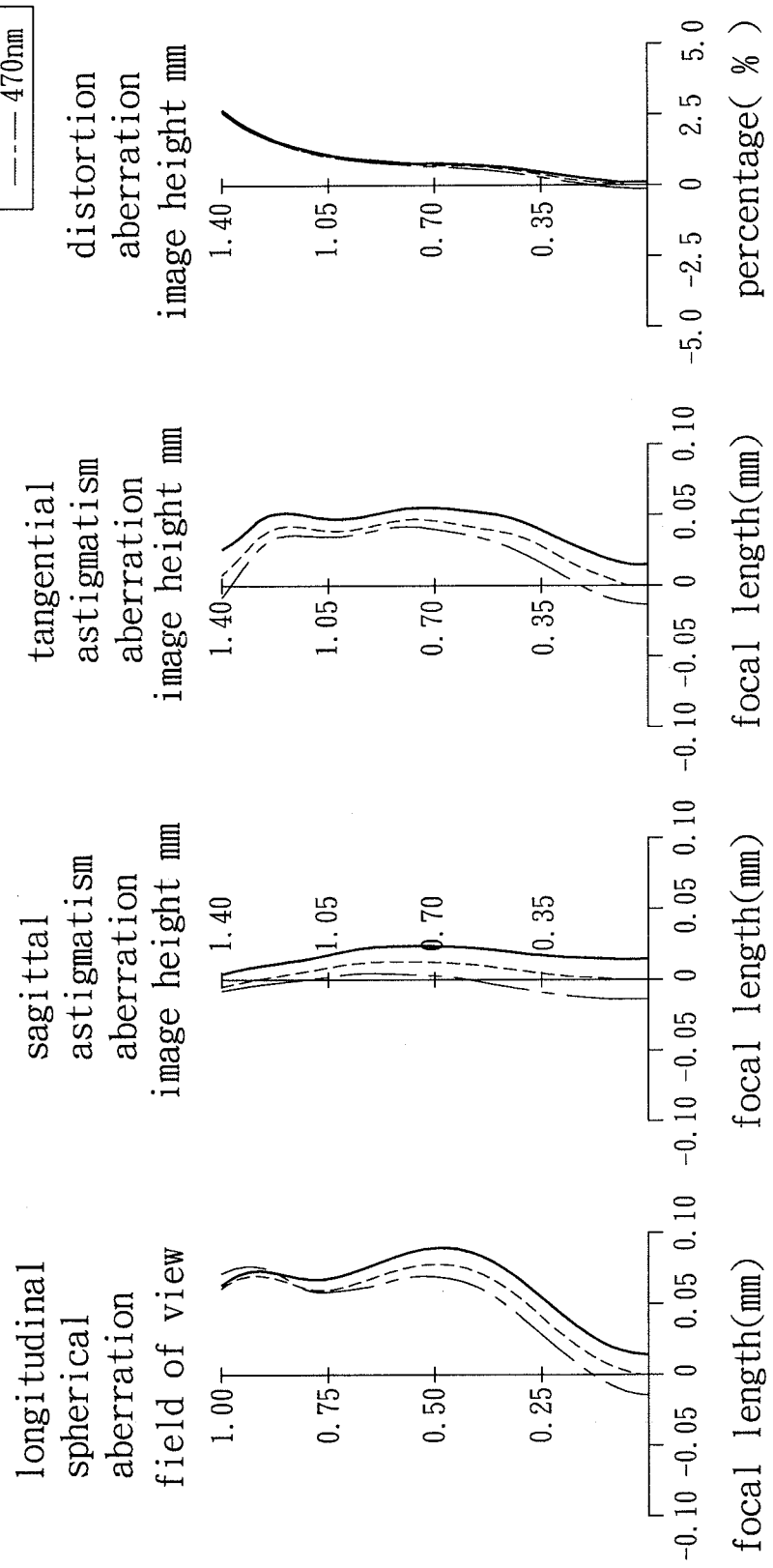
FIGS. 25(a) to 25(d) show different optical characteristics of the imaging lens of the sixth preferred embodiment.

Referring to FIG. 22, the difference between the first and sixth preferred embodiments resides in that:

The image-side surface 32 of the first lens element 3 is a convex surface.

Shown in FIG. 23 is a table that lists values of some optical parameters corresponding to the surfaces 31-61, 32-62 of the sixth preferred embodiment. The imaging lens 10 has an overall system focal length of 2.175 mm, an HFOV of 31.57°, and a system length of 2.805 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are as follows:

$EFL/AG_{23}=43.494$ $AAG/CT_2=1.790$ $ALT/CT_2=5.690$ $AG_{12}/AG_{23}=3.098$

FIGS. 25(a) to 25(d) show simulation results corresponding to longitudinal spherical aberration, sagittal astigmatism aberration, tangential astigmatism aberration, and distortion aberration of the sixth preferred embodiment, respectively. It can be understood from FIGS. 25(a), 25(b), 25(c) and 25(d) that the sixth preferred embodiment is likewise able to achieve a relatively good optical performance even with the system length reduced down to below 3 mm.

Shown in FIG. 26 is a table that lists the aforesaid relationships among some of the aforementioned optical parameters corresponding to the preferred embodiments for comparison. When each of the optical parameters of the imaging lens 10 according to this invention satisfies the following optical relationships, the optical performance is still relatively good even when the system length is reduced down to below 3 mm:

$EFL/AG_{23} \leq 45.0$ (2)

$AAG/CT_2 \leq 3.0$ (3)

$ALT/CT_2 \leq 8.0$ (4)

$1 \leq AG_{12}/AG_{23}$ (5)

$0.8 \leq EFL \leq 3.0$ (6)

When the imaging lens 10 satisfies optical relationship (2), it favors reduction of the system length. When EFL/

$AG_{23}>45.0$, large EFL may be unfavorable for miniaturization of the imaging lens 10, while small $AG_{23}$ indicates that the second and third lens elements 4, 5 may be too close, so that when the second lens element 4 is designed to have a convex portion 422 in a vicinity of a periphery thereof, there may be interference between the second and third lens elements 4, 5 due to manufacturing tolerance, resulting in adverse effects on assembly and optical performance. In addition, $EFL/AG_{23}$ is preferable to range between 10.0 and 45.0, but should not be limited thereto.

When the imaging lens 10 satisfies optical relationship (3), AAG and $CT_2$ fall within an appropriate length range. Otherwise, large AAG may be unfavorable for reduction of the system length, and small $CT_2$ may render manufacturing of the imaging lens 10 difficult. In addition, $AAG/CT_2$ is preferable to range between 1.0 and 3.0, but should not be limited thereto.

When the imaging lens 10 satisfies optical relationship (4), ALT and $CT_2$ fall within an appropriate length range. Otherwise, large ALT may be unfavorable for reduction of the system length, and small $CT_2$ may render manufacturing of the imaging lens 10 difficult. In addition, $ALT/CT_2$ is preferable to range between 3.0 and 8.0, but should not be limited thereto.

When the imaging lens 10 satisfies optical relationship (5), which means that the distance between the first and second lens elements 3, 4 is equal to or larger than the distance between the second and third lens elements 4, 5, and due to the positive refractive power of the first lens element 3 and the negative refractive power of the second lens element 4, optical performances of the first and second lens elements 3, 4 are enhanced. In addition, $AG_{12}/AG_{23}$ is preferable to range between 1 and 5, so as to prevent an excessively large distance between the first and second lens elements 3, 4 that may undesirably affect miniaturization, or to prevent interference which result from an excessively small distance between the second and third lens elements 4, 5.

When the imaging lens 10 satisfies optical relationship (6), the system length of the imaging lens 10 may be effectively reduced using conventional techniques.

To sum up, effects and advantages of the imaging lens 10 according to the present invention are described hereinafter.

1. The positive refractive power of the first lens element 3 may provide a necessary refractive power for the overall imaging lens 10, while the negative refractive power of the second lens element 4 may correct optical aberration.

2. Through design of the image-side surface 52 of the third lens element 5 and the convex portion 611 of the object-side surface 61 of the fourth lens element 6 to be disposed in the vicinity of the optical axis (I), the gap between the third and fourth lens elements 5, 6 may be reduced without compromising optical performance.

3. The fourth lens element 6 has the image-side surface 62 with the concave portion 621 in the vicinity of the optical axis (I) and the convex portion 622 in the vicinity of the periphery of the fourth lens element 6, so that light may arrive at the image plane 8 through a relatively horizontal path, resulting in higher sensitivity of the light sensors at the image plane 8.

4. The convex portion 422 of the image-side surface 42 of the second lens element 4, which is in the vicinity of the periphery of the second lens element 4, cooperates with the image-side surface 52 of the third lens element 5 to reduce the optical aberration.

5. Through design of the relevant optical parameters, such as $EFL/AG_{23}$, $AAG/CT_2$, $ALT/CT_2$, and $AG_{12}/AG_{23}$, optical aberrations, such as spherical aberration, may be reduced or eliminated. Further, through design and arrangement of the concave and convex portions of the lens elements 3-6, even when the system length is reduced, optical aberrations may still be reduced or eliminated, resulting in relatively good optical performance.

6. Through the aforesaid six preferred embodiments, it is known that the system length of this invention may be reduced down to below 3 mm, so as to facilitate developing thinner relevant products with economic benefits.

Figure 27:
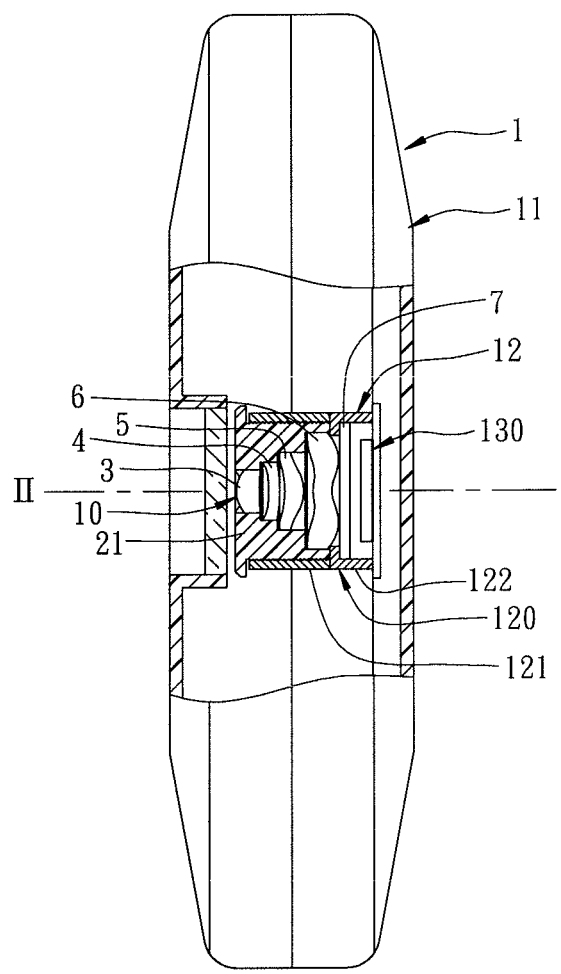
FIG. 27 is a schematic partly sectional view to illustrate a first exemplary application of the imaging lens of the present invention.

Shown in FIG. 27 is a first exemplary application of the imaging lens 10, in which the imaging lens 10 is disposed in a housing 11 of an electronic apparatus 1 (such as a mobile phone), and forms apart of an imaging module 12 of the electronic apparatus 1. The imaging module 12 includes a barrel 21 on which the imaging lens 10 is disposed, a seat unit 120 on which the barrel 21 is disposed, and an image sensor 130 disposed at the image plane 8 (see FIG. 1) and operatively associated with the imaging lens 10 for capturing images.

The seat unit 120 includes a first seat portion 121 in which the barrel 21 is disposed, and a second seat portion 122 having a portion interposed between the first seat portion 121 and the image sensor 130. The barrel 21 and the first seat portion 121 of the seat unit 120 extend along an axis (II), which coincides with the optical axis (I) of the imaging lens 10.

Figure 28:
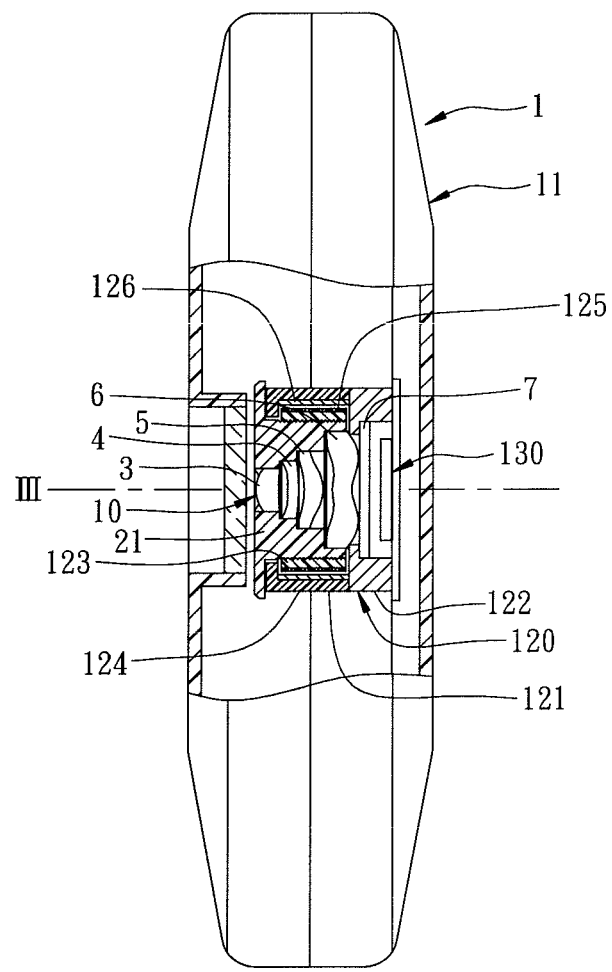
FIG. 28 is a schematic partly sectional view to illustrate a second exemplary application of the imaging lens of the present invention.

Shown in FIG. 28 is a second exemplary application of the imaging lens 10. The difference between the first and second exemplary applications resides in that, in the second exemplary application, the seat unit 120 is configured as a voice-coil motor (VCM), and the first seat portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 7 of the imaging lens 10 is disposed at the second seat portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization. Furthermore, application and configuration of the imaging lens 10 are not limited to such.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising first, second, third, and fourth lens elements arranged from an object side to an image side in the given order, each of said first, second, third, and fourth lens elements having an object-side surface facing toward the object side and an image-side surface facing toward the image side, wherein:

said first lens element has a positive refractive power, and said object-side surface thereof is a convex surface;

said second lens element has a negative refractive power, and said image-side surface thereof has a convex portion in a vicinity of a periphery of said imaging lens;

said image-side surface of said third lens element is a convex surface, and said object-side surface of said third lens element has a concave portion in a vicinity of a periphery of said third lens element;

said object-side surface of said fourth lens element has a convex portion in a vicinity of an optical axis of said imaging lens;

said image-side surface of said fourth lens element is a curved surface and has a concave portion in a vicinity of the optical axis of said imaging lens, and a convex portion in a vicinity of a periphery of said fourth lens element; and said imaging lens does not include any lens element with refractive power other than said first, second, third, and fourth lens elements;

wherein said imaging lens satisfies 0.8 mm≤EFL≤3.0 mm, where EFL represents an effective focal length of said imaging lens.

2. The imaging lens as claimed in claim 1, wherein said imaging lens further satisfies $ALT/CT_2 \leq 8.0$, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, and a distance between said object-side surface and said image-side surface of said fourth lens element at the optical axis; and $CT_2$ represents a distance between said object-side surface and said image-side surface of said second lens element at the optical axis.

3. The imaging lens as claimed in claim 2, wherein said imaging lens further satisfies $1 \leq AG_{12}/AG_{23} \leq 5$, where $AG_{12}$ represents a distance between said image-side surface of said first lens element and said object-side surface of said second lens element at the optical axis of said imaging lens; and $AG_{23}$ represents a distance between said image-side surface of said second lens element and said object-side surface of said third lens element at the optical axis of said imaging lens.

4. The imaging lens as claimed in claim 1, wherein said imaging lens further satisfies $AAG/CT_2 \leq 3.0$, where AAG represents a sum of a distance between said image-side surface of said first lens element and said object-side surface of said second lens element at the optical axis, a distance between said image-side surface of said second lens element and said object-side surface of said third lens element at the optical axis, and a distance between said image-side surface of said third lens element and said object-side surface of said fourth lens element at the optical axis, and $CT_2$ represents a distance between said object-side surface and said image-side surface of said second lens element at the optical axis.

5. The imaging lens as claimed in claim 4, wherein said imaging lens further satisfies $ALT/CT_2 \leq 8.0$, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, and a distance between said object-side surface and said image-side surface of said fourth lens element at the optical axis.

6. The imaging lens as claimed in claim 5, wherein said imaging lens further satisfies $1 \leq AG_{12}/AG_{23} \leq 5$, where $AG_{12}$ represents a distance between said image-side surface of said first lens element and said object-side surface of said second lens element at the optical axis of said imaging lens; and $AG_{23}$ represents a distance between said image-side surface of said second lens element and said object-side surface of said third lens element at the optical axis of said imaging lens.

7. An electronic apparatus comprising:

a housing; and an imaging module disposed in said housing, and including an imaging lens as claimed in claim 1, a barrel on which said imaging lens is disposed, a seat unit on which said barrel is disposed, and an image sensor disposed at the image side and operatively associated with said imaging lens for capturing images.

8. The electronic apparatus as claimed in claim 7, wherein said seat unit includes a first seat portion including an inner section in which said barrel is disposed, and an outer section that surrounds said inner section, said inner section of said first seat portion, said barrel, and said imaging lens being movable together with respect to said image sensor along the optical axis.

9. The electronic apparatus as claimed in claim 7, wherein said seat unit further includes a second seat portion, which is disposed between said outer section of said first seat portion and said image sensor, and which is disposed to abut against said outer section.

10. The imaging lens as claimed in claim 1, wherein said imaging lens further satisfies $EFL/AG_{23} \leq 45.0$, where $AG_{23}$ represents a distance between said image-side surface of said second lens element and said object-side surface of said third lens element at the optical axis of said imaging lens.

11. The imaging lens as claimed in claim 10, wherein said imaging lens further satisfies $1 \leq AG_{12}/AG_{23}$, where $AG_{12}$ represents a distance between said image-side surface of said first lens element and said object-side surface of said second lens element at the optical axis of said imaging lens.

12. The imaging lens as claimed in claim 11, wherein said image-side surface of said second lens element further has a convex portion in a vicinity of the optical axis of said imaging lens, and said imaging lens further satisfies $1 \leq AG_{12}/AG_{23} \leq 5$.

13. The imaging lens as claimed in claim 10, wherein said imaging lens further satisfies $ALT/CT_2 \leq 8.0$, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, and a distance between said object-side surface and said image-side surface of said fourth lens element at the optical axis; and $CT_2$ represents a distance between said object-side surface and said image-side surface of said second lens element at the optical axis.

14. The imaging lens as claimed in claim 13, wherein said imaging lens further satisfies $1 \leq AG_{12}/AG_{23}$, where $AG_{12}$ represents a distance between said image-side surface of said first lens element and said object-side surface of said second lens element at the optical axis of said imaging lens.

15. The imaging lens as claimed in claim 13, wherein said image-side surface of said second lens element further has a convex portion in a vicinity of the optical axis of said imaging lens.

16. The imaging lens as claimed in claim 10, wherein said imaging lens further satisfies $AAG/CT_2 \leq 3.0$, where
- AAG represents a sum of a distance between said image-side surface of said first lens element and said object-side surface of said second lens element at the optical axis, a distance between said image-side surface of said second lens element and said object-side surface of said third lens element at the optical axis, and a distance between said image-side surface of said third lens element and said object-side surface of said fourth lens element at the optical axis, and
- $CT_2$ represents a distance between said object-side surface and said image-side surface of said second lens element at the optical axis.

17. The imaging lens as claimed in claim 16, wherein said imaging lens further satisfies $ALT/CT_2 \leq 8.0$, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, and a distance between said object-side surface and said image-side surface of said fourth lens element at the optical axis.

18. The imaging lens as claimed in claim 17, wherein said imaging lens further satisfies $1 \leq AG_{12}/AG_{23}$, where $AG_{12}$ represents a distance between said image-side surface of said first lens element and said object-side surface of said second lens element at the optical axis of said imaging lens.

19. The imaging lens as claimed in claim 17, wherein said image-side surface of said second lens element further has a convex portion in a vicinity of the optical axis of said imaging lens.

* * * * *